United States Patent [19]

Hellmiss et al.

[11] 4,042,082
[45] Aug. 16, 1977

[54] DEVICE FOR RECEIVING, FROM A FIXED ELECTRIC CONNECTION, ADAPTING TO LENGTH, AND HOLDING CONDUCTORS FOR THE ELECTRIC CURRENT SUPPLY OF MOVABLE CONSUMERS

[75] Inventors: Otto E. Hellmiss; Heinrich Simon, both of Kassel, Germany

[73] Assignee: Rheinstahl Aktiengesellschaft, Essen, Germany

[21] Appl. No.: 639,870

[22] Filed: Dec. 11, 1975

[30] Foreign Application Priority Data

Dec. 12, 1974    Germany .............................. 2458758

[51] Int. Cl.² ........................................... H02G 11/02
[52] U.S. Cl. ............................ 191/12.2 A; 191/12 R
[58] Field of Search .................... 191/12.2 R, 12.2 A, 191/12 R; 242/54 R, 156.2; 254/150 R, 190 R; 339/2 RL, 2 R

[56] References Cited

U.S. PATENT DOCUMENTS 3,466,588   9/1969   Bradshaw ........................ 191/12.2 R Primary Examiner—Trygve M. Blix
Assistant Examiner—Reinhard J. Eisenzopf
Attorney, Agent, or Firm—Walter Becker

[57] ABSTRACT

A device for receiving, from a fixed electric connection, adapting to length, and holding conductors for the electric current supply of movable consumers. The electric conductors are moved by way of at least one carriage in conformity with the movement of the consumer along a guiding path, especially for rotatable superstructures. The carriage which may be similar to a trolley is equipped with at least one spool box having at least one rotatably mounted and easily exchangeable winding mandrel which is provided with a slot extending transverse to the longitudinal axis of the mandrel for passing therethrough a flat cable adapted to wind itself up. When the pre-load of the flat cable is reduced, a tensioning force can be exerted by way of remote control upon the winding mandrel. The consumer connection is provided with entraining mechanism which serves as cable carrier and is guided in the manner of a carriage or trolley. The spool box is provided with a plurality of guiding rollers for the flat cable, and the entraining mechanism has guiding strips bent off at the ends thereof while outside the spool box and the entraining mechanism there is provided a roller path serving as guiding and holding portion for the flat cable sections between the fixed electric connection and the spool box and between the latter and the entraining mechanism.

6 Claims, 4 Drawing Figures

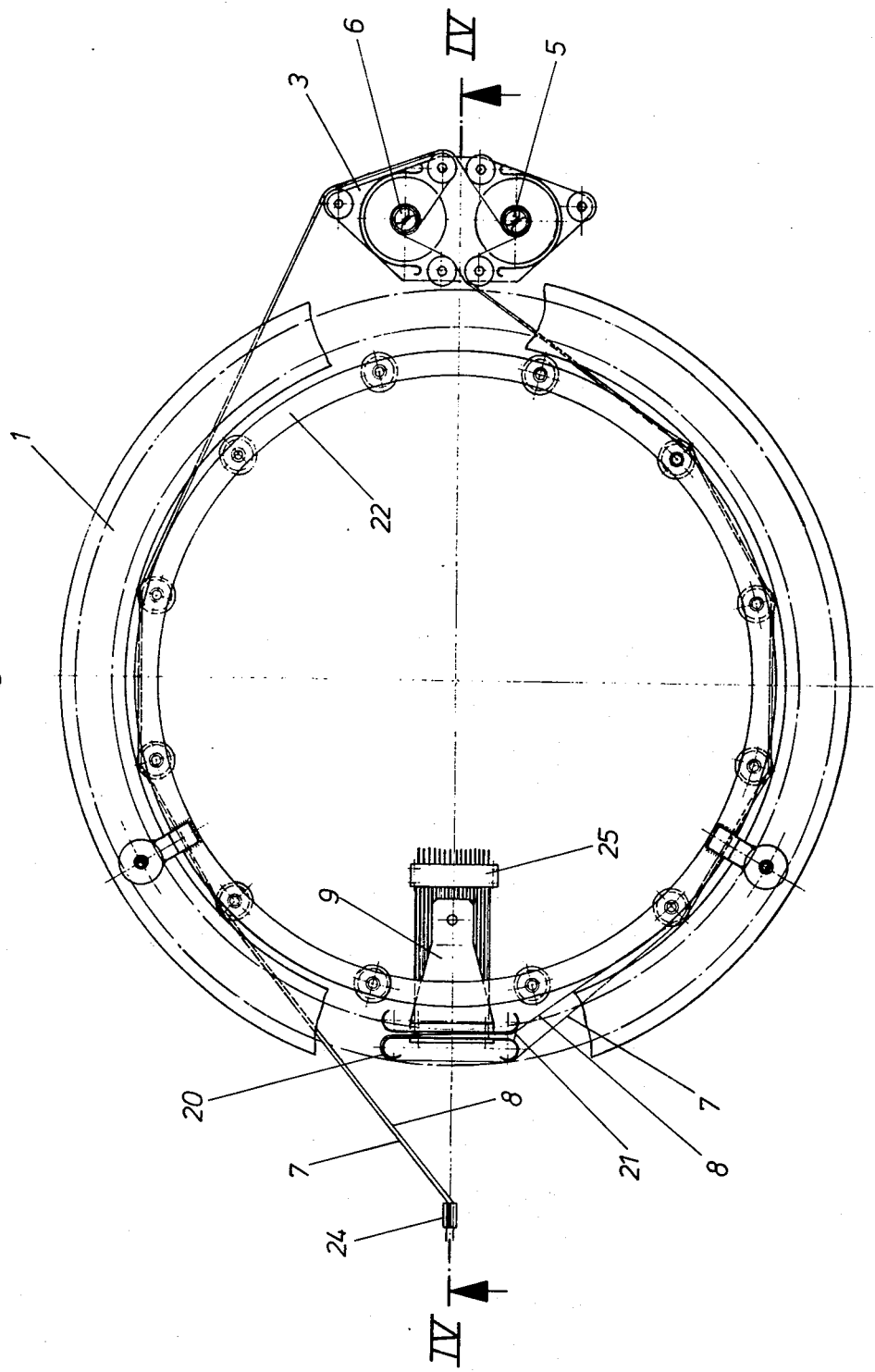

DEVICE FOR RECEIVING, FROM A FIXED ELECTRIC CONNECTION, ADAPTING TO LENGTH, AND HOLDING CONDUCTORS FOR THE ELECTRIC CURRENT SUPPLY OF MOVABLE CONSUMERS

The present invention relates to a device for receiving, adapting to length, and holding conductors for the electric supply of movable consumers from a fixed connection place while the conductors are guided by means of at least one carriage in conformity with the movement of the consumer connection along a guiding path, especially for rotatably structures.

Guiding means of this type for conductors for use in connection with current feeding means without sliding contacts have become known particularly for carriages or trolleys for crane installation. For instance, conductor guiding means have become known according to which a drag cable system is provided with cables which are suspended on cable carriages in a garland-like manner.

In order to avoid the so-called cable loops, it has become known with printed wiring and cabling to employ a multi-pole flexible flat cable which is produced according to the accordion principle, which means consists of a rolled-up pretensioned lap which after being rolled out automatically rolls itself in by its own tension (see the magazine "Elektronik" 1966, issue 9, page 268).

With vehicles equipped with a movable structure, as is the case for instance with armored vehicles with rotatable turret, the electric energy has heretofore been conveyed to the structure by means of a slide ring transmitter comprising a slide ring connected to the movable structure and a stator arranged on the vehicle chassis. Such designs, however, are very liable to disorders, and furthermore with this type of transmission transmission losses are unavoidable.

Inasmuch as nowadays frequently devices with numerous electric and electronic parts arranged in the movable vehicle structure are used, a slide ring transmission no longer suffices, but for the transmission of, for instance, electric measured values and/or electric energy a plurality of individual conductors are required which are combined to a cable.

It is, therefore, an object of the present invention to design a device of the above described type as simple as possible so that it will have a simple and compact design and that always a taut guiding of the electric supply conductors will be assured.

This object and other objects and advantages of the invention will appear more clearly from the following specification in connection with the accompanying drawings, in which:

FIG. 3 is a top view of the design of FIG. 1 in which the consumer connection has moved over a distance of approximately 360° and in which the length of movement of the trolley-like carriage corresponds to about half the length of movement of the consumer connection.

Figure 1:
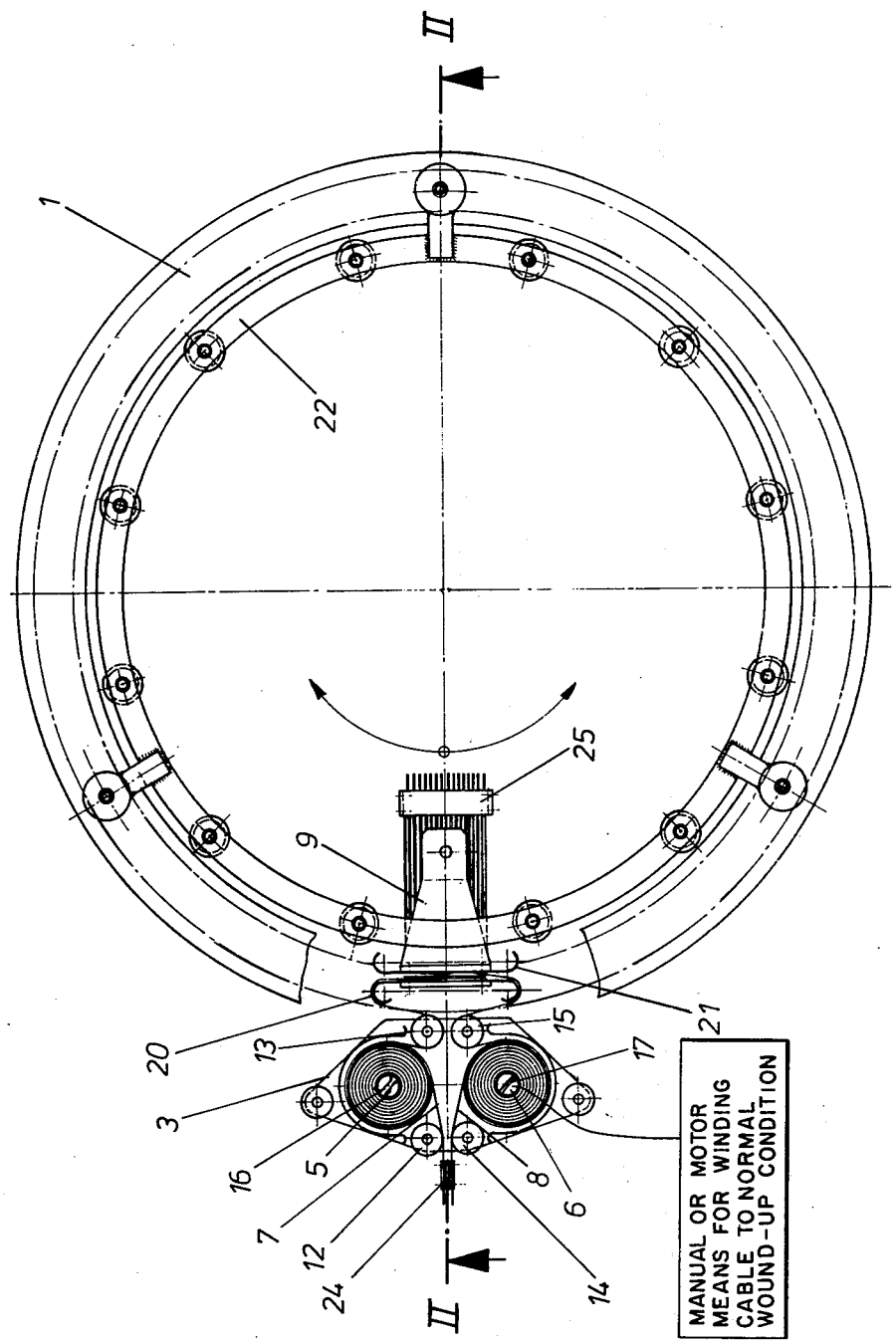
FIG. 1 is a top view of a device according to the invention in which the trolley-like carriage is equipped with a cassette or spool box and occupies its normal position with the consumer connection.

The above outlined objects have been realized according to the present invention by the fact that the trolley-like carriage comprises at least one cassette or spool box with at least one winding mandrel which is rotatably journalled and easily exchangeable and which has a slot arranged transverse to the longitudinal axis and serving for passing therethrough the conductors combined to form a flat double-wound cable which rolls itself up while, when the preload of the flat cable decreases, by remote control a tensioning force can be exerted upon the winding mandrel. The consumer connection is provided with an entraining means or a driver which is guided in the manner of trolleys and serves as cable carrier. Furthermore, for the flat cable on the spool box there is provided a plurality of guiding rollers and on the entraining means there are provided guiding strips bent off at the ends, while outside the spool box and the entraining means there is provided a roller path serving as guiding and holding means for the flat cable sections located between the fixed connecting place and the spool box and between the latter and the entraining means.

According to one development of the invention each winding mandrel is provided with springs which are designed as power storage means and are adapted to act upon each winding mandrel. These power storage means are so designed that, after the tensioning force of the flat cable which rolls itself up has decreased, they still have the energy required for rolling up the flat cable.

An important feature of the present invention consists in that for each winding mandrel a mechanical drive or motor may be used instead of the springs for returning the flat cable to its normal position.

A further feature of the invention consists in that each winding mandrel is manually rotatable through the intervention of entrainment means (for instance a square head, a polygonal surface for engagement by a wrench, or the like).

A preferred embodiment when employing a primarily circular guiding path with a supporting roller path coaxially arranged therewith consists in that the trolley-like carriage and the entraining means are movable from the normal position in clockwise as well as in counter-clockwise direction.

The advantages realized by the present invention consist primarily in that a sagging of the supply conductors will be safely avoided and that with a substantially circular guiding path a guiding of the conductors over a path of more than 360° will be possible.

There will now be described an embodiment of the device according to the invention with circular guiding paths for the trolley-like carriage and for the entraining means connected to the consumer connection and the supporting roller path coaxially arranged therewith. More specifically, the illustrated device comprises a guiding path 1 and a movable trolley-like carriage 2 which serves for receiving, for instance, a spool box 3 with two winding mandrels 5 and 6 for winding up and winding off respectively a double-wound flat cable which rolls itself up. The two flat cables 7 and 8 electrically connect a fixed connection with a connection for a movable consumer.

To the connection of the movable consumer there is connected an entraining means 9 which serves as cable carrier and is likewise in a trolley-like manner guided on the guiding path 1. The carriage 2 and the entraining means 9 are for this purpose equipped with roller bodies which in spaced relationship to each other and alongside each other are displaceable in T-shaped grooves 10 and 11 of the guiding path 1.

The spool box 3 is provided with guiding rollers 12, 13; 14, 15 within the region of the area where the cable is introduced as well as in the area where the cable is pulled out. Each winding mandrel 5, 6 is rotatably mounted in the spool box 3 and is easily exchangeable and is provided with a slot 16, 17 extending transverse to the longitudinal axis. The flat cable is passed through the slot and is guided for the winding-up and winding-off operation. In the double-wound flat cables 7, 8 which are adapted to roll themselves up there is embedded a plurality of electric conductors which are insulated with regard to each other. Each lap due to its own tension exerts a tensioning force for winding up onto the winding mandrel. In view of the specific windings of the flat cables 7 and 8 the carraige 2 moves over a distance which is only half the distance over which the entraining means 9 designed as cable carrier moves.

Furthermore each winding mandrel 5, 6 is provided with springs 18, 19 which serve as power storage means and which, when the tensioning force of the flat cable rolling itself up decreases, act with the necessary energy upon the winding mandrels.

For each winding mandrel 5, 6 it is also possible instead of employing springs 18, 19 for the return of the flat cables 7, 8 to normal position to use a mechanical drive or a motor (not shown).

Figure 2:
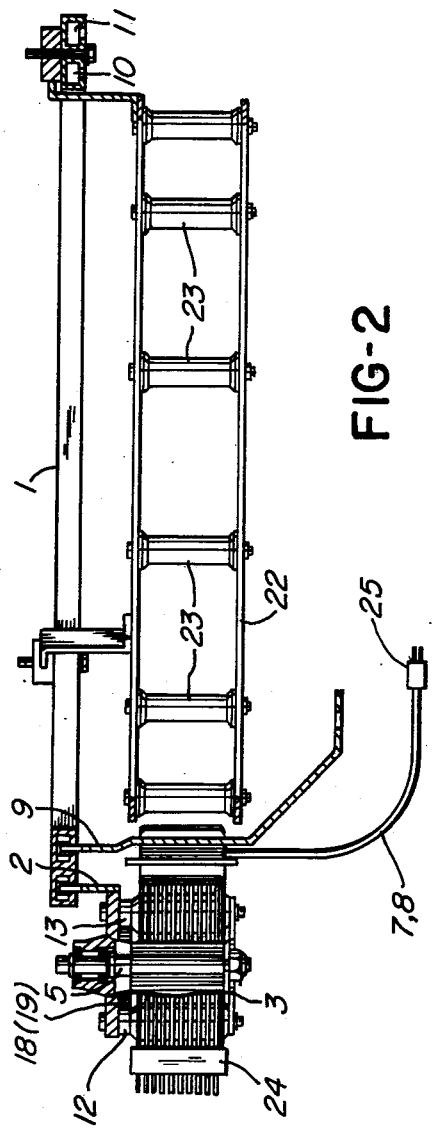
FIG. 2 represents a section taken along the line II—II of FIG. 1 with partially broken open cassette.
Figure 4:
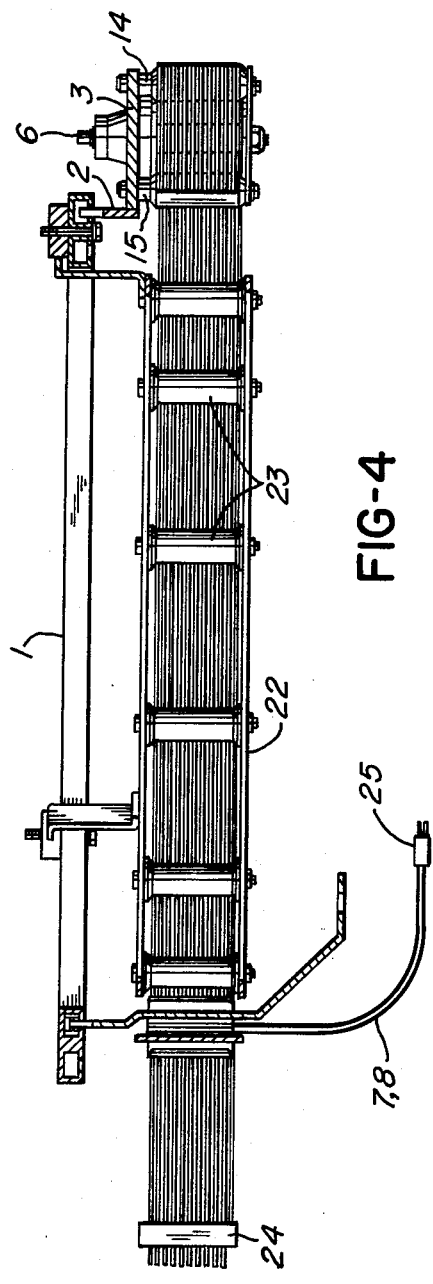
FIG. 4 represents a section taken along the line IV——IV of FIG. 3.

As will be seen from FIGS. 2 and 4, each winding mandrel 5, 6 is manually rotatable by entraining means, for instance, a square head or a polygonal surface of a wrench, or the like.

The entraining means 9 serving as cable carrier is provided with a cable connection, and for the flat cables 7 and 8 fed at both sides there are provided guiding strips 20 and 21 which have bent-off guiding surfaces at the ends over which the two cables are passed.

A roller path 22 with a plurality of supporting rollers 23 preferably evenly spaced from each other is connected with respect to the guiding path 1. The rollers 23 corresponding to the distance over which the entraining means 9 has moved serve as guiding and holding means for the two flat cables 7 and 8. The cable ends are provided with coupling pieces 24, 25 known per se.

When employing the device with a predominantly circular guiding path 1 with a supporting roller path 22, 23 coaxial therewith, the trolley-like carriage 2 and the entraining means 9 are movable in clockwise direction as well as in counterclockwise direction from their normal position.

It is, of course, to be understood that the present invention is, by no means, limited to the specific showing in the drawings, but also comprises any modifications within the scope of the appended claims.

What we claim is:

1. A device for receiving electric conductors from a fixed electric connection, adapting said conductors to length and holding the same for the electric current supply of movable consumers, which includes in combination: at least one spool box having at least one rotatably and exchangeably mounted winding storage mandrel associated with said spool box, said mandrel also being provided with means for passing said electric conductor in the form of a cable therethrough, winding-up means associated with said mandrel for winding up said cable, a consumer connection provided with entraining means forming a movable cable carrier, a guiding path for guiding said carrier along said guiding path, said spool box being provided with a plurality of guiding rollers for said cable, and the entraining means having guiding strips bent off at the ends thereof, and a roller path arranged outside said spool box and said entraining means for simultaneously guiding and holding the cable sections between the fixed electric connection and the spool box and between the latter and said entraining means.

2. A device in combination according to claim 1, in which said cable is a self-winding flat cable, and in which said means for passing said cable therethrough includes a slot provided in said at least one mandrel and extending transverse to the longitudinal axis thereof.

3. A device in combination according to claim 2, which includes spring means associated with said at least one mandrel and serving as power storage means while continuously urging said at least one mandrel to wind up said cable.

4. A device in combination according to claim 3, which includes motor means drivingly connected to said at least one winding mandrel for winding up said cable to its normal wound-up condition.

5. A device in combination according to claim 3, in which said at least one mandrel is provided with means for manually winding up said cable into its normal wound-up condition.

6. A device in combination according to claim 3, in which said guiding path is predominantly circular and the said roller path is coaxially arranged thereto, and in which said carrier and said entraining means are movable from a normal position selectively in either direction, the clockwise and counter-clockwise direction.

* * * * *